(12) United States Patent
Elsheemy

(10) Patent No.: US 10,438,484 B2
(45) Date of Patent: Oct. 8, 2019

(54) SYSTEM FOR MISSING PERSON AND STOLEN PROPERTY SEARCH

(71) Applicant: Mohamed Roshdy Elsheemy, Akron, OH (US)

(72) Inventor: Mohamed Roshdy Elsheemy, Akron, OH (US)

( * ) Notice: Subject to any disclaimer, the term of this patent is extended or adjusted under 35 U.S.C. 154(b) by 0 days.

(21) Appl. No.: 15/999,883

(22) Filed: Aug. 29, 2018

(65) Prior Publication Data

US 2019/0066495 A1 Feb. 28, 2019

Related U.S. Application Data

(62) Division of application No. 14/544,801, filed on Feb. 20, 2015, now Pat. No. 10,121,370.

(51) Int. Cl.

| | |
|---|---|
| *G08G 1/07* | (2006.01) |
| *G08G 1/087* | (2006.01) |
| *G01C 21/36* | (2006.01) |
| *B60R 25/00* | (2013.01) |
| *G08B 21/02* | (2006.01) |
| *G08G 1/005* | (2006.01) |
| *G08G 1/01* | (2006.01) |
| *G08G 1/017* | (2006.01) |
| *G08G 1/08* | (2006.01) |
| *G08G 1/0962* | (2006.01) |

(Continued)

(52) U.S. Cl.
CPC .............. *G08G 1/087* (2013.01); *B60R 25/00* (2013.01); *G01C 21/3691* (2013.01); *G08B 21/0202* (2013.01); *G08G 1/005* (2013.01); *G08G 1/012* (2013.01); *G08G 1/017* (2013.01); *G08G 1/0112* (2013.01); *G08G 1/0116* (2013.01); *G08G 1/0133* (2013.01); *G08G 1/0141* (2013.01); *G08G 1/052* (2013.01); *G08G 1/08* (2013.01); *G08G 1/0965* (2013.01); *G08G 1/09623* (2013.01); *G08G 1/09626* (2013.01); *G08G 1/096716* (2013.01); *G08G 1/096758* (2013.01); *G08G 1/096775* (2013.01); *G08G 1/096791* (2013.01); *G01S 13/92* (2013.01)

(58) Field of Classification Search
CPC ....... H04W 4/029; G08G 1/087; G08G 1/005; G08G 1/01; G08G 1/08; B60R 25/00; G01C 21/3691; G08B 21/0202
See application file for complete search history.

(56) References Cited

U.S. PATENT DOCUMENTS

| | | | |
|---|---|---|---|
| 6,437,690 B1 * | 8/2002 | Okezie | B60R 25/00 340/505 |
| 9,277,386 B1 * | 3/2016 | Masiero | H04W 4/029 |

(Continued)

*Primary Examiner* — Phung Nguyen

(57) ABSTRACT

A system for missing person and stolen property search by remotely logging surveillance data transmitted by an RFID tag attached to the missing person or attached to the stolen property where the RFID tag in close proximity to vehicles; wherein the vehicles receive and store the surveillance data to make a real time connection between the vehicles and the RFID tag; the system comprising: a first in-vehicle apparatus on-board civilian vehicles; a second in-vehicle apparatus on-board law enforcement vehicles; an RFID tag attached to a person or attached to a portable property; wherein the first in-vehicle apparatus is configured to wirelessly communicate with the RFID tag to receive data associated with the RFID tag.

3 Claims, 17 Drawing Sheets

(51) Int. Cl.
  G08G 1/0965 (2006.01)
  G08G 1/0967 (2006.01)
  G08G 1/052 (2006.01)
  *G01S 13/92* (2006.01)

(56) References Cited

U.S. PATENT DOCUMENTS

| | | | |
|---|---|---|---|
| 2011/0285535 A1* | 11/2011 | Barwin | G08B 21/24 |
| | | | 340/572.1 |
| 2017/0352250 A1* | 12/2017 | de Barros Chapiewski | ................ |
| | | | H04W 4/029 |
| 2019/0178978 A1* | 6/2019 | Martinez | G01S 5/0294 |

* cited by examiner

S = SHORT RANGE SIGNAL
L = LONG RANGE SIGNAL
C = COMMANDS

580

SYSTEM FOR MISSING PERSON AND STOLEN PROPERTY SEARCH

CROSS-REFERENCE TO RELATED APPLICATION(S)

The present application claims priority to U.S. application Ser. No. 14/544,801 filed on Feb. 20, 2015, entitled "Comprehensive traffic control system" which is currently U.S. Pat. No. 10,121,370 the entire disclosure of which are incorporated by reference herein, and is referred herein as ELSHEEMY. [The systems of high speed pursuits, radar, law enforcement safety, . . . etc of the U.S. application Ser. No. 14/544,801 are allowed for issuance].

FIELD OF THE INVENTION

The present invention relates to missing person search and crime-fighting systems.

BACKGROUND AND SUMMARY OF THE INVENTION

As been described in ELSHEEMY the present invention provides a system that utilizes radio signals and cellular network technologies along with GPS technology. The system consists of a number of electronic units, each one of these units performs a number of programmed functions to achieve a preferred overall operation of the system.

Some of these units include: THE POLICE VEHICLE UNIT, THE ORDINARY VEHICLE UNIT "VEHICLE UNIT", and RFID TAGS.

The Vehicle Unit

This unit uses a long range radio frequency transceiver module, preferably (1-2 mile) range, and a short range radio frequency transceiver module, preferably (0.1-0.2 mile range), along with a cellular-network circuit board, antenna, a thermal module and a GPS (Global Positioning System) receiver module. The circuit board is considered the brain component of the unit, it runs the entire system of the unit, the circuit board consist of a few computer chips. There are both digital-to-analog and analog-to-digital conversion computer chips within the circuit board. They convert audio signals going out from analog to digital, and then they convert the audio signals from digital back into analog.

The flash memory and ROM components of the unit circuit board serve as a storage location for the unit. They store the vehicle identification number "VIN" code, cellphone codes, the GPS digital map application, the GPS readings; "coordinates, speed, heading and date/time", the RFID tag readings "tag code (ID) and date/time", as well as the entire operating system.

The microprocessor is in charge of dealing with all the tasks that are to be performed by the unit. It also focuses on the unit's control signals (to and from the base station) and command options. It helps to interconnect all of the terminal display main functions.

The liquid crystal display (LCD) or the like, is a terminal display and connected to the unit through a Universal Serial Bus (USB) cable and comprises a number of Light Emitting Diode (LED) indicators, microphone, speaker, a camera and a number of buttons.

The vehicle unit is configured in a manner to disturb the vehicle "engine control unit" when the vehicle unit is being removed or tampered with. In another embodiment, the vehicle unit is integrated with the engine control unit to be more difficult to be removed.

The Police Unit

This unit comprises similar electronic components as the vehicle unit, but its terminal display is a touch screen interface and capable of displaying colored pictures. The police unit can communicate with the vehicle unit via the long range or the short range radio frequency, also the police unit can communicate with the vehicle unit via the cellular network.

Furthermore, the police unit stores the "control operating system" which is responsible for all the control commands needed to manipulate the vehicle unit. The police unit also stores the vehicle model, type and class category application.

RFID Tags

Radio-frequency identification (RFID) active/semi active tags use a very short range preferably (2 to 6 meter) radio frequency to communicate with the vehicle unit over its short range frequency transceiver.

The Vehicle Model, Type and Class Category Application

Auto manufacturers worldwide produce variety of vehicles, which come in different sizes and body shapes each year, therefore each vehicle is defined by its make, model, body shape, year of built and its identification number.

All of these characteristics may be summarized in a unique code, which is called VEHICLE IDENTIFICATION NUMBER code (VIN).

A VIN code, is a unique code including a serial number, used by the automotive industry to identify individual motor vehicles, as defined in ISO 3833.

The vehicle descriptor section of the VIN code is used to identify the vehicle type, the model and the body style. While, vehicle identifier section of the VIN is used to identify the individual vehicle.

The present invention creates the vehicle type/model file by reading the VIN to determine the make and model of the vehicle and by having a set of pictures taken from different angles for each vehicle model and store them in a file, the vehicles in the file are arranged in a list of categories, each category contains the vehicles that share the same body shape and size. The pictures in this file can take any desired color to resemble the color of a target vehicle. The vehicle type/model file could be updated and uploaded into the police unit on predetermined dates.

Cellular Communication Codes

CELL-PHONE CODES: All cell phones have special codes associated with them. These codes are used to identify the phone. But in the present invention these codes will be transmitted from the police unit to the vehicle unit to give the vehicle unit a temporary ability to connect to the cellular network. Each one of the police vehicles is assigned a number of sets of "Cell-phone Codes or SIM card data" to enable the police vehicle unit to lend the vehicle unit the necessary codes that are required for cellular communication.

Electronic Serial Number (ESN): a unique 32-bit number programmed into the phone when it is manufactured. Mobile Identification Number (MIN): a 10-digit number derived from any phone's number. System Identification Code (SID): a unique 15-bit number that is assigned to each carrier by the Federal Communications Commission (FCC).

When someone powers up his cellphone, his cellphone looks for the System Identification Code (SID), on the cellphone control channel. And when the cellphone receives the SID, the phone compares it to the SID programmed into the phone. If the SIDs match, the phone knows that the cell it is communicating with is part of its home system.

Along with the SID, the phone also transmits a registration request, and the Mobile Telephone Switching Office (MTSO) keeps track of the phone's location in a database. This way, the MTSO knows which cell he is in when it wants to call his phone. Therefore, the records of where his cellphone is located give a pretty good idea of where he is. The cellphone carrier, for example (AT&T) stores these records in a database and this may raise serious privacy concern issues if a third party such as National Security Agency (NSA), or other authority agency gets hold of these records without a search warrant. Normally the cellphone carriers charge the cellphone owner monthly fees for the subscribed service.

Presently many vehicles' location registration systems utilize the cellular network technology to keep the vehicles' location continually recorded in a database, for monitoring, security purposes and traffic related matters. These systems require a permanent cellular subscribed service, which is very costly process when it deals with millions of vehicles, in addition to the violation of the vehicles' owners privacy.

The present invention creates an alternative method for, remotely, selectively and temporarily logging a motor vehicle to solve a specific matter, without compromising the privacy concerns of the innocent drivers. Also without the need for making them continually connected to the cellular network or paying for subscribed service.

The police vehicle unit communicates with the vehicle unit via a set of control commands to force it to execute a selected function or application.

The Police LCD Unit Interfaces

The police liquid crystal display (LCD) or the like, is a touch screen terminal display, it is connected to the police unit through a USB cable and comprises a number of LED indicators, microphone, speaker, a camera and a number of buttons. The display processor and software are responsible to interpret input from the touch-screen as commands. The police officer can access the control commands by either the touch screen input or by voice.

Voice recognition software designed to place each phoneme in a context based on the other phonemes in the software, which immediately picks up or registers from the police officer. The software program accomplishes this by running the phonemes through a statistical model based on mathematical computations called algorithms, and by comparing the phonemes with a library of command words, phrases and sentences it has stored. The voice recognition program then outputs the officer's words as text or executes the appropriate command. This way the police officer can comfortably use the police unit and focuses on driving his vehicle with a lot of concentration while driving in high speed. Thus, to achieve a high efficiency of the present invention.

The Vehicle LCD Unit

This terminal display may be either touch-screen or non touch-screen, its main job is to display the alert messages that transmitted by the police unit, or traffic logging unit, or in some cases to display alert messages related to the digital map. In some other embodiments the touch-screen display may be used for customized applications or programs such as some applications come with the cell phones.

Missing Person Search and Crime-Fighting Method

Many kids and loved ones go missing every year, and this may cause a huge pain and severe long lasting psychological trauma for the parents, family members and friends. People go missing for a number of reasons, an old person with the Alzheimer's disease may wander around or get lost without the ability to contact his family or his care giver. Some of the teenagers runaway from their families is often a common problem. Children and adults may go missing when they become victims of a foul play.

Generally when a loved one goes missing, panic occurs, and his family's mind is in turmoil, his family accounts—in as much detail as possible where the person was and what he was doing before he went missing. This may urge calling friends, family members or going to places that the person frequents, and finally filing a missing person report with the local police.

Furthermore, robbery or burglary is a serious crime when a perpetrator commits an offense, usually that offense will be theft. Generally the perpetrator or perpetrators use a getaway car to escape the crime scene after committing the offense. There are some known ways the police use to fight bank robbery crimes, such as hiding a GPS device with cash stolen by the robbery suspect, and tracking him down then arresting him. Also banks may use RFID tags hidden with the cash to assist in tracking the stolen cash, which may lead to the arrest of a suspect robber.

RFID are used for the purposes of automatically identifying and tracking tags attached to objects, such as personal possessions, clothing, cash, . . . etc. The tags contain electronically stored information. Some types of very short range (a few meters) active/semi active tags have an on-board tiny battery and periodically transmit their identification signal.

The present invention utilizes the RFID technology to allow the very short range (few meters) read-only active/semi active RFID tags to be logged in the vehicle unit at a real-time, to make a real connection between the missing person or the stolen object that carries the RFID tag and a vehicle or vehicles to assist in a quick and efficient tracking, also to use this connection as an evidence in criminal cases.

Generally, when an RFID tag passes through the field of the scanning antenna, it detects the activation signal from the antenna. That "wakes up" the RFID chip, and it transmits the information on its microchip to be picked up by the scanning antenna of the tag reader "interrogator".

Whereas, RFID active/semi active tag of the present invention uses a very short range preferably (2 to 6 meter) radio frequency to communicate with the vehicle unit over its short range frequency transceiver. The tag will automatically and periodically transmit its identification signal once every one or few minutes to protect its on-board battery from wearing out in a short time, the user can remove the on-board battery every time the tag is not in use. Additionally, in another embodiment of the RFID tag, the tag will start periodically transmit its identification signal every time the user activates it by pressing on a button integrated in it, and when the vehicle unit comes in the range of the tag signal, it will store the tag ID (code) in real-time status. Therefore, the vehicle unit is programmed to create a tag report which contains the tag ID, the VIN code of the vehicle, and a brief location of the vehicle associated with the date/time in which the tag was logged in the vehicle.

BRIEF DESCRIPTION OF THE DRAWINGS

The invention is herein described, by way of example only, with reference to the accompanying drawings, wherein:

FIG. 7 Also illustrates an example of a chased target vehicle being tracked on the digital map and displayed on the police LCD unit.

DETAILED DESCRIPTION OF THE INVENTION

Figure 1:
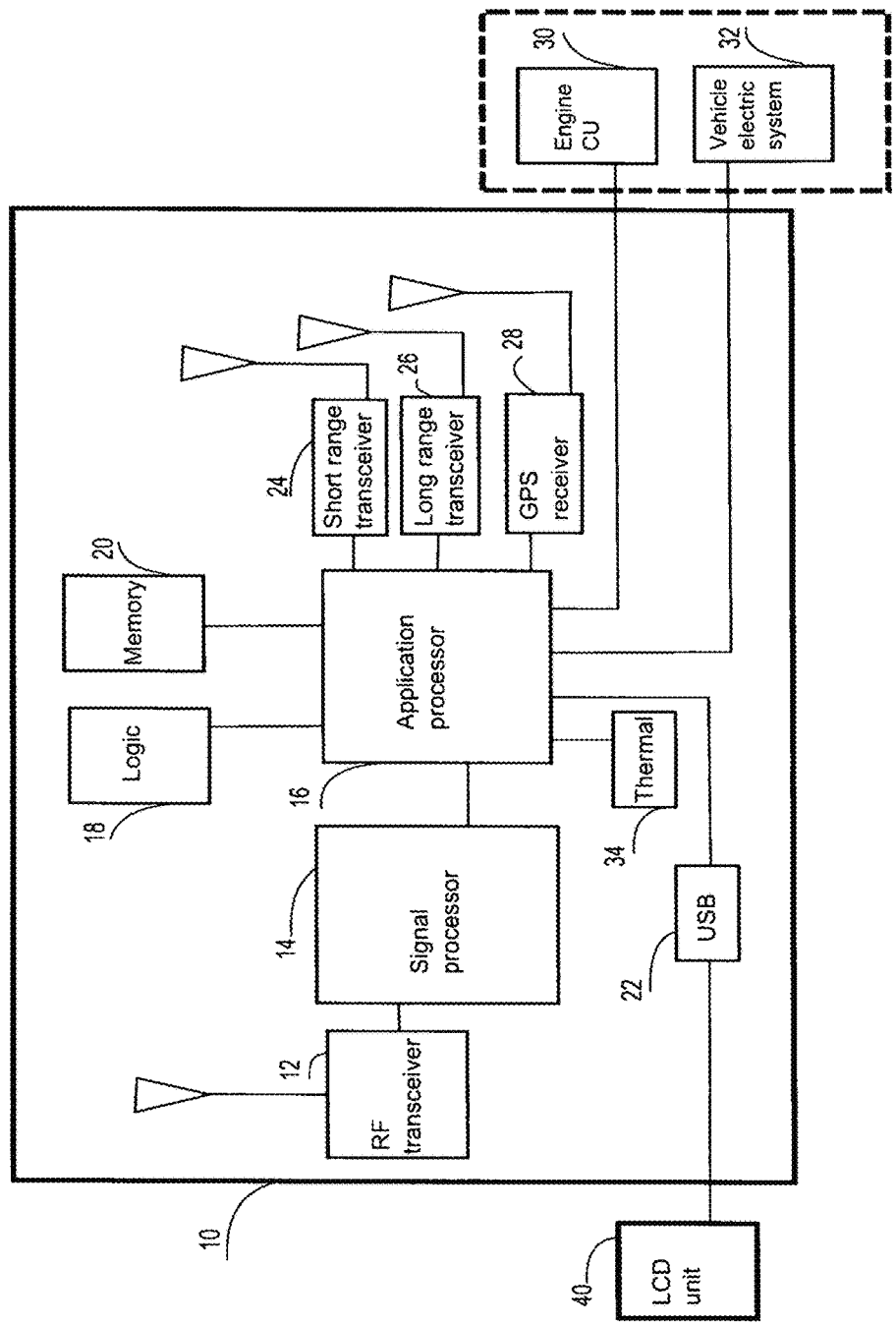
FIG. 1 Is a block diagram of the vehicle unit 10.
Figure 2:
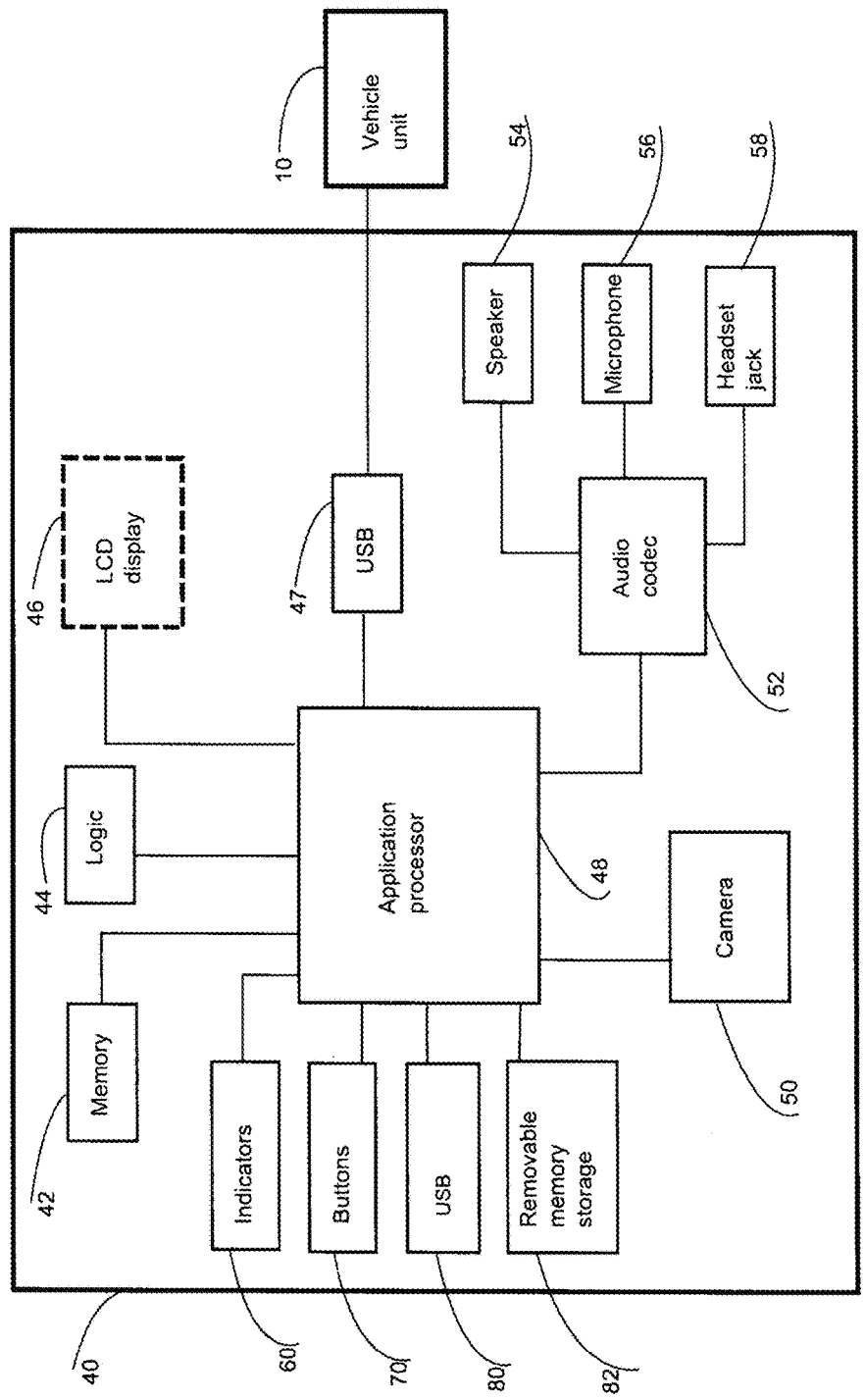
FIG. 2 Is a block diagram of the vehicle LCD unit 40, (the vehicle unit 10 and the LCD unit 40 will be referred as unit V10).

As shown in FIG. 1 and FIG. 2, the vehicle unit V10 installed in each new and used vehicle, and is powered by the vehicle's electric system 32. Vehicle unit 10 includes a RF transceiver 12, analog/digital signal processor 14, application processor 16, logic chips 18, memory chips 20, a USB port 22, a short range transceiver 24, a long range transceiver 26, and a GPS receiver module 28. Vehicle unit 10 is connected to the engine control unit (ECU) 30 in a manner to disturb the vehicle (ECU) when the vehicle unit V10 is being removed or tampered with.

There are both digital-to-analog and analog-to-digital conversion computer chips within the processor 14. They convert audio signals going out from analog to digital, and then they convert the audio signals from digital back into analog. The unit V10 is designed to connect to the cellular network and to communicate with the police vehicle unit P210 as well. The microprocessor 16 is in charge of dealing with most of the tasks that are to be performed by the unit V10. It also focuses on the unit's control signals (to and from the base station) and the control commands functions. It helps to interconnect all of the LCD unit 40 main functions. The memory 20 includes the flash memory and ROM components of the unit circuit board serve as a storage location for the unit. It stores the vehicle identification number "VIN" code, also the memory 20 temporary stores cellphone codes transmitted by the police vehicle unit P210 for a selected period of time, the memory 20 also stores the database of the GPS digital map application, the GPS readings for a period of time such as (the last 30 minutes of the vehicle movement), wherein these readings include "coordinates, speed, heading and date/time", also it stores the RFID active tag readings "tag number at real-time status", as well as the entire operating system.

The unit 10 uses a long range radio frequency transceiver module 26, preferably (1-2 mile) range, and a short range radio frequency transceiver module 24, preferably (0.1-0.2 mile range), a thermal module 34, and a GPS receiver module 28 to determine the location, heading, speed and date/time of the vehicle. The thermal module 34 is used for determining the temperature inside the vehicle.

Figure 3:
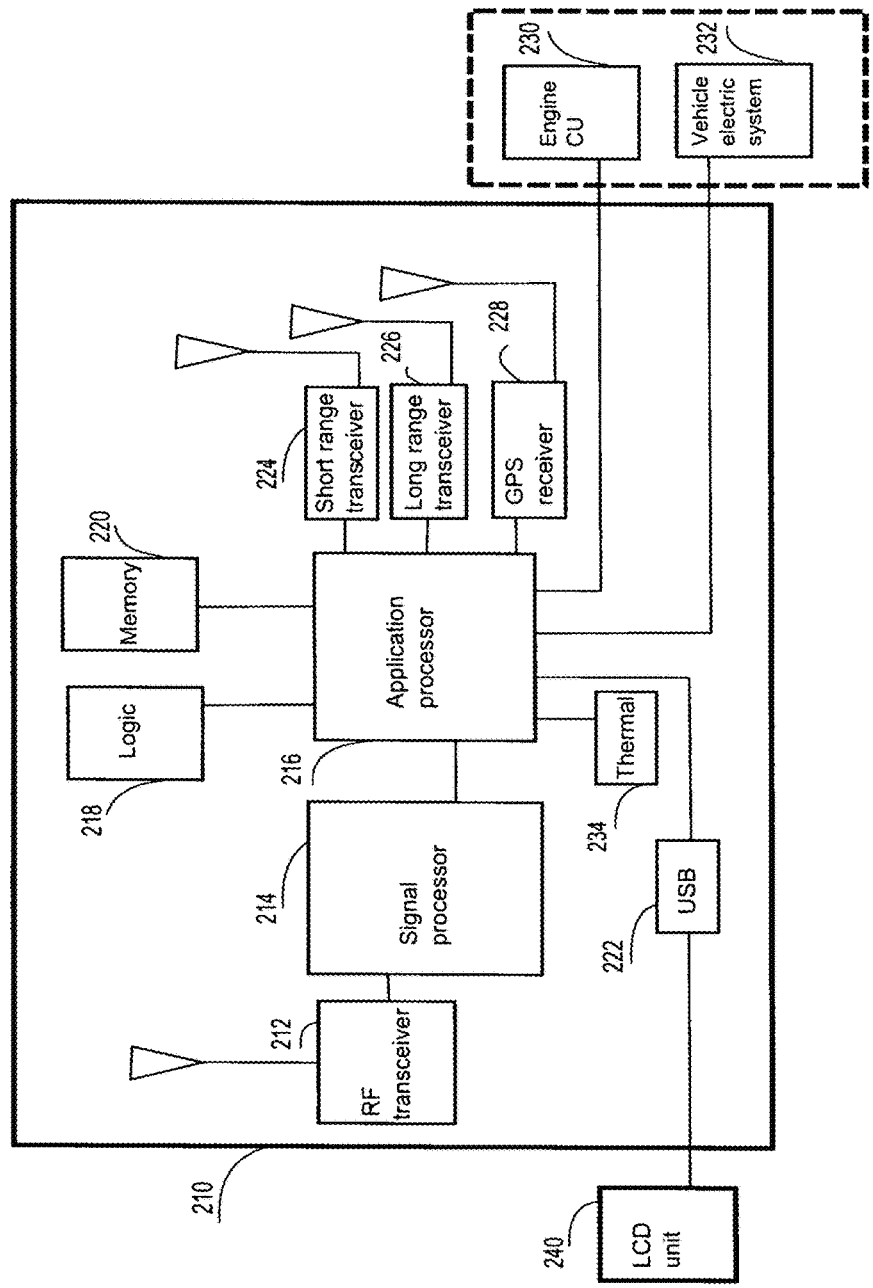
FIG. 3 Is a block diagram of the police vehicle unit 210.
Figure 4:
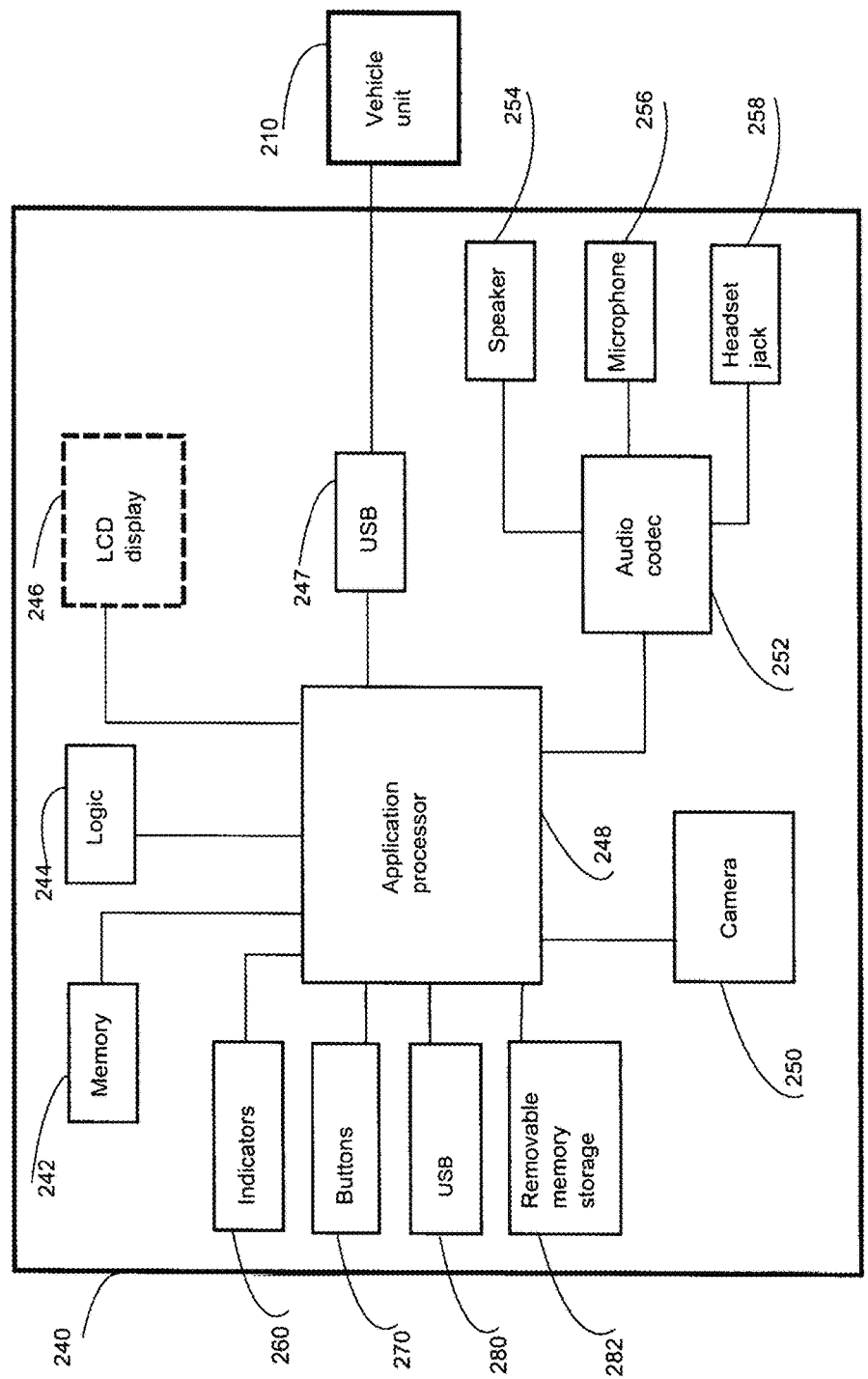
FIG. 4 Is a block diagram of the police vehicle LCD unit 240, (the police vehicle unit 210 and the LCD unit 240 will be referred as unit P210).
Figure 5:
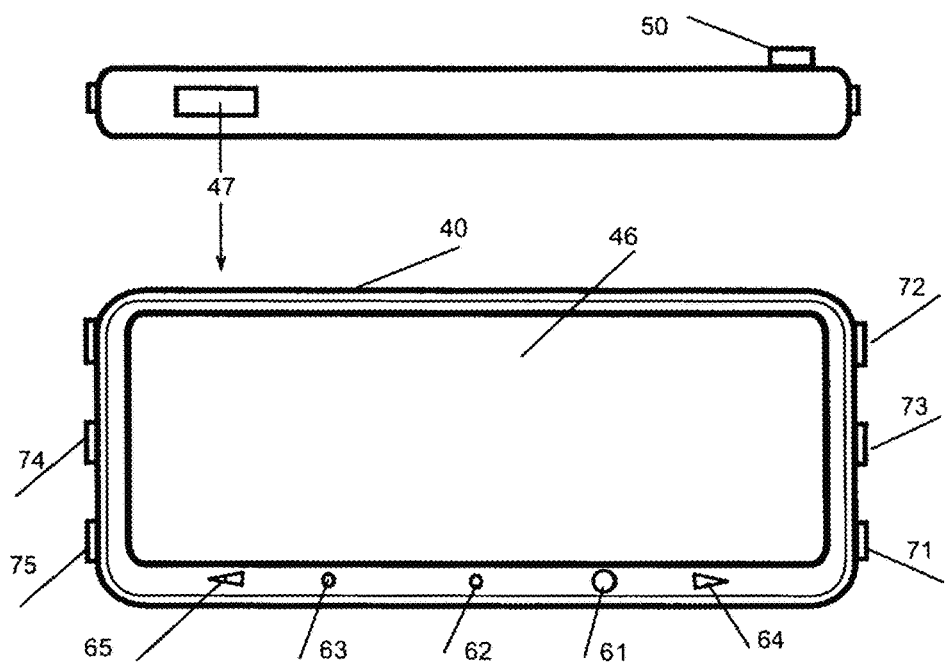
FIG. 5 Illustrates an example of the vehicle LCD unit 40 (front and top view).
Figure 6:
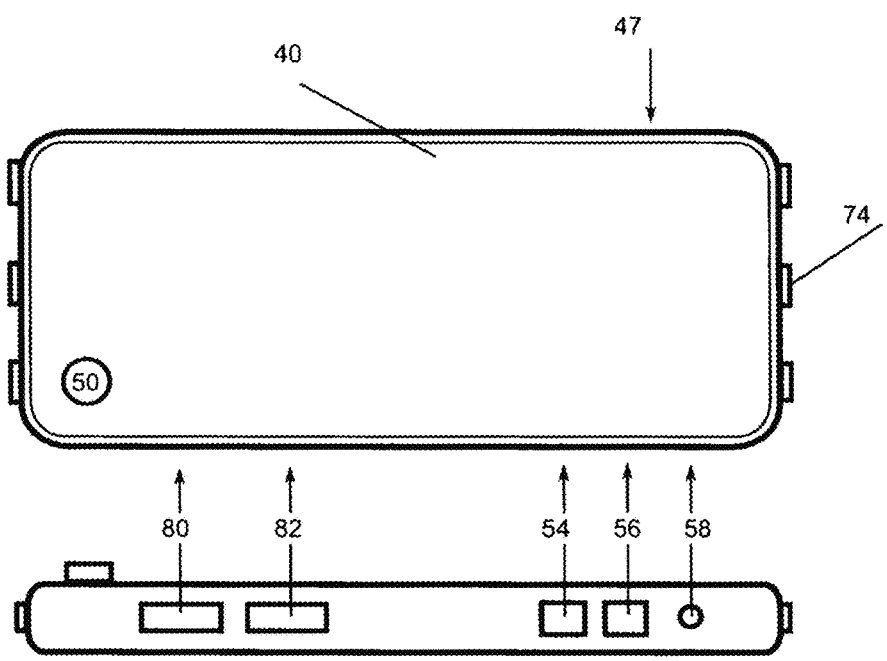
FIG. 6 Illustrates an example of the vehicle LCD unit 40 (rear and bottom view).
Figure 7:
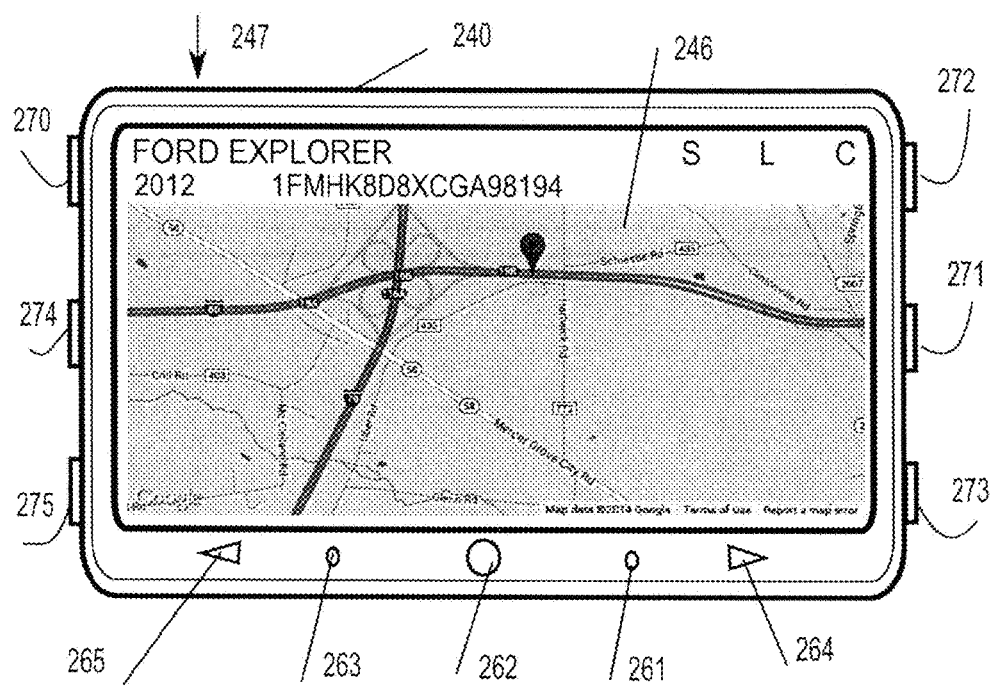
FIG. 7 Illustrates an example of the police vehicle LCD unit 240 (front view).
Figure 26:
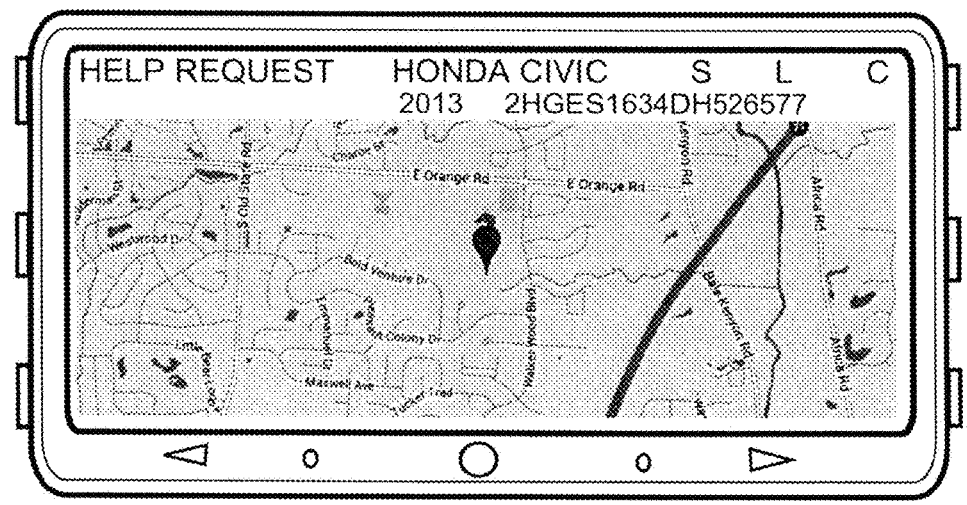
FIG. 26 Illustrates an example of a help request transmitted by a vehicle.
Figure 8:
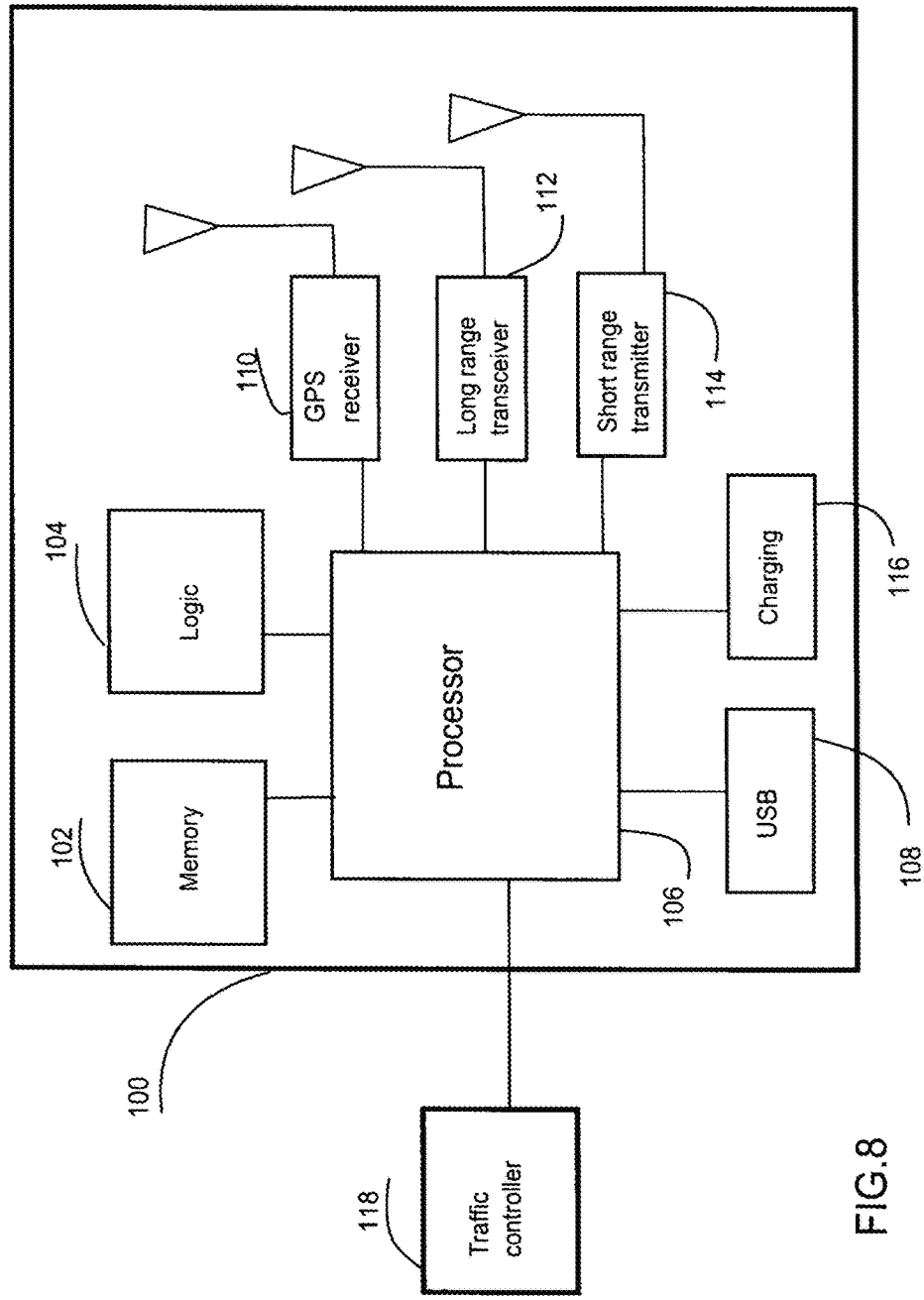
FIG. 8 Is a block diagram of the intersection unit 100.
Figure 9:
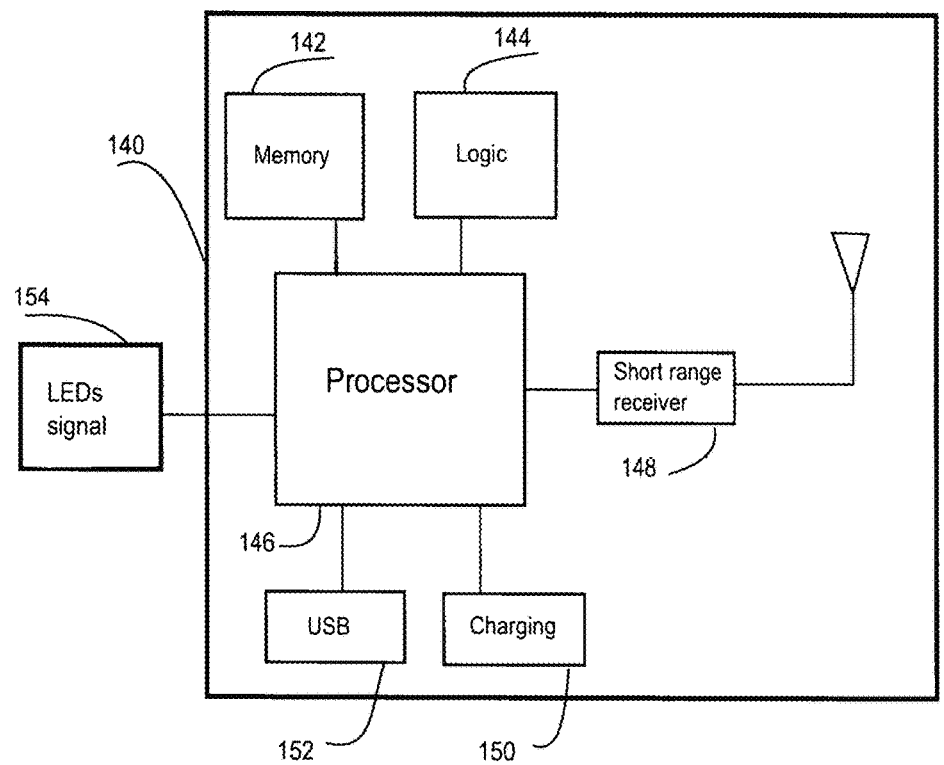
FIG. 9 Is a block diagram of the pedestrians unit 140.
Figure 10:
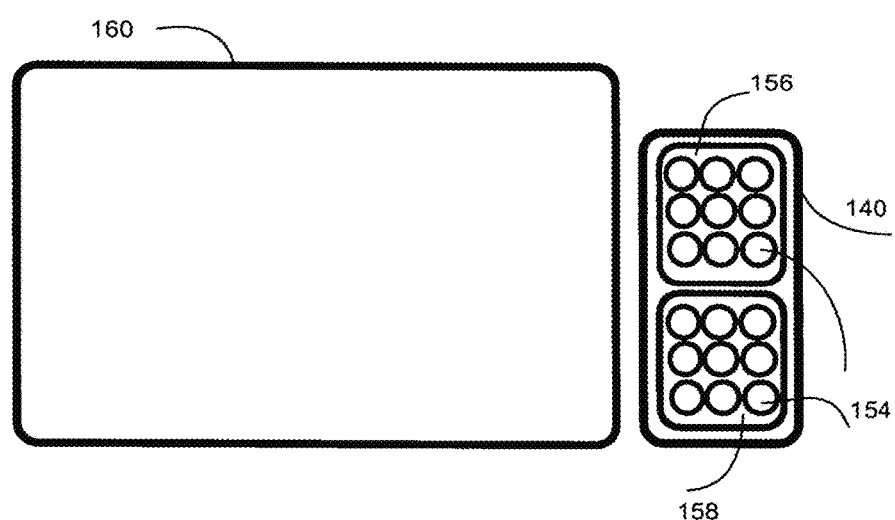
FIG. 10 Illustrates an example of the pedestrians unit 140 (front view).
Figure 11:
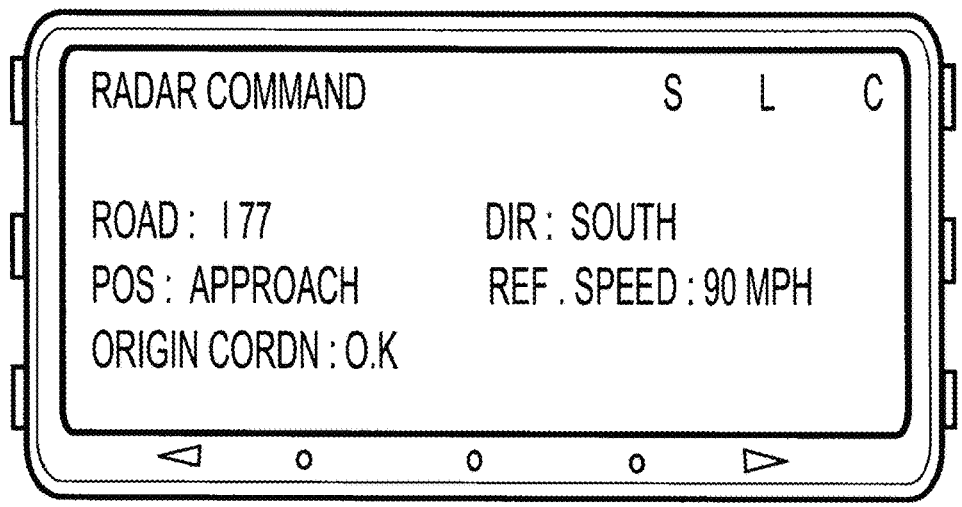
FIG. 11 Illustrates an example of the radar process. It shows the inputted parameters by the police to apply a radar command displayed on the police vehicle LCD unit.
Figure 12:
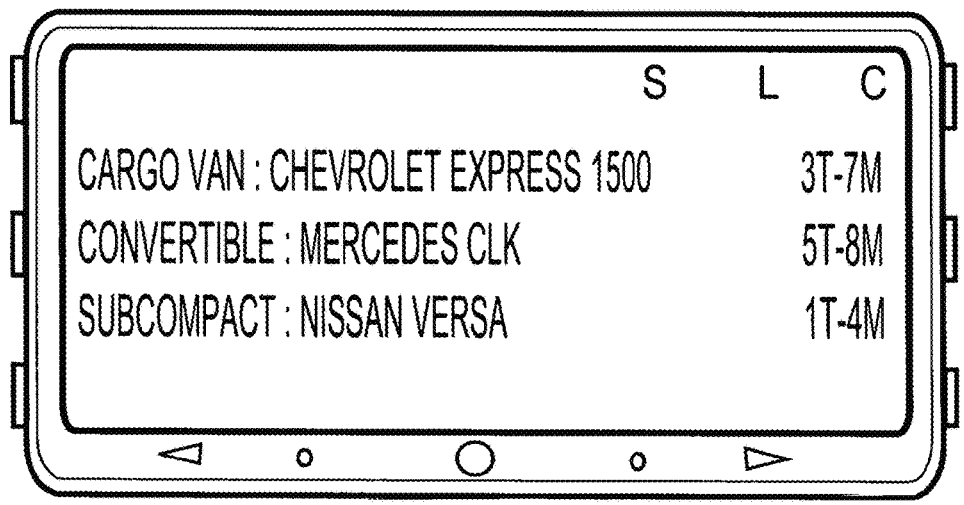
FIG. 12 Illustrates the list of the responding vehicles displayed on the police vehicle LCD unit.
Figure 13:
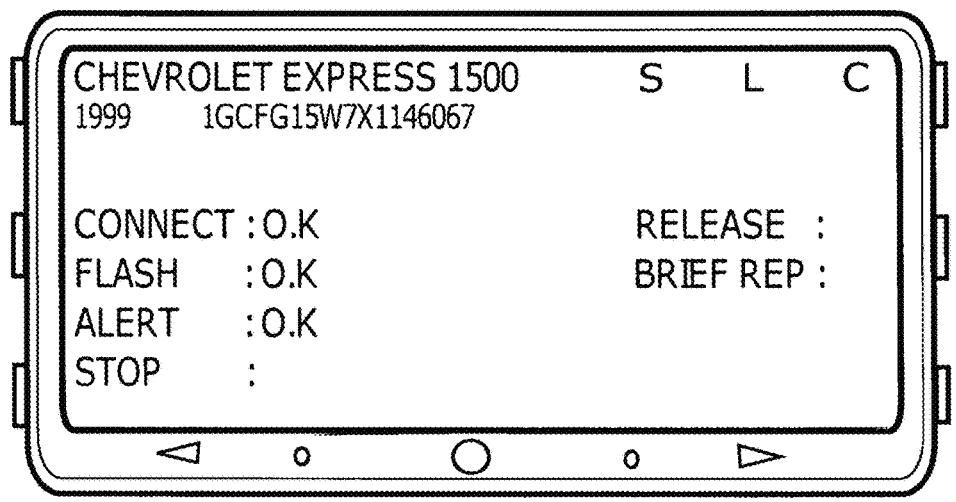
FIG. 13 Illustrates inputting (connect, flash and alert) commands to transmit them to the cited vehicle who displayed on the police vehicle LCD unit.
Figure 14:
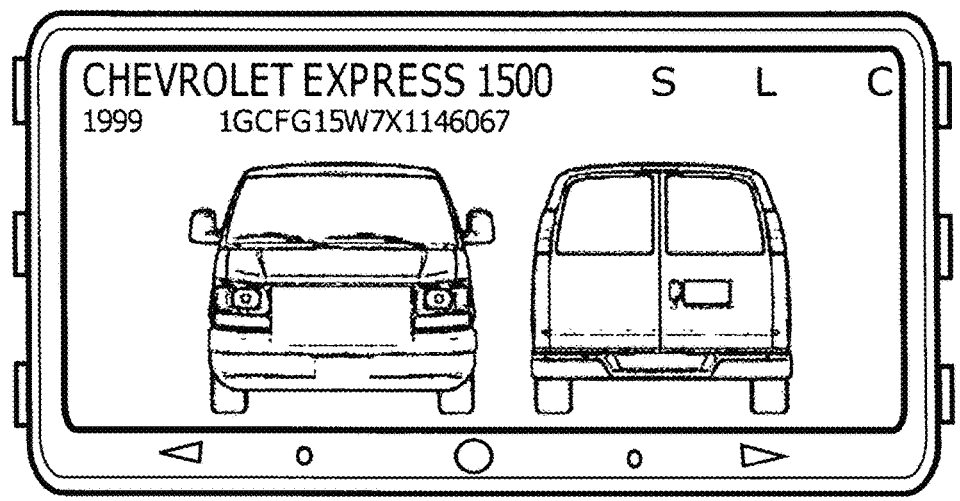
FIG. 14 Illustrates the pictures of the cited vehicle based on its model displayed on the police vehicle LCD unit.
Figure 15:
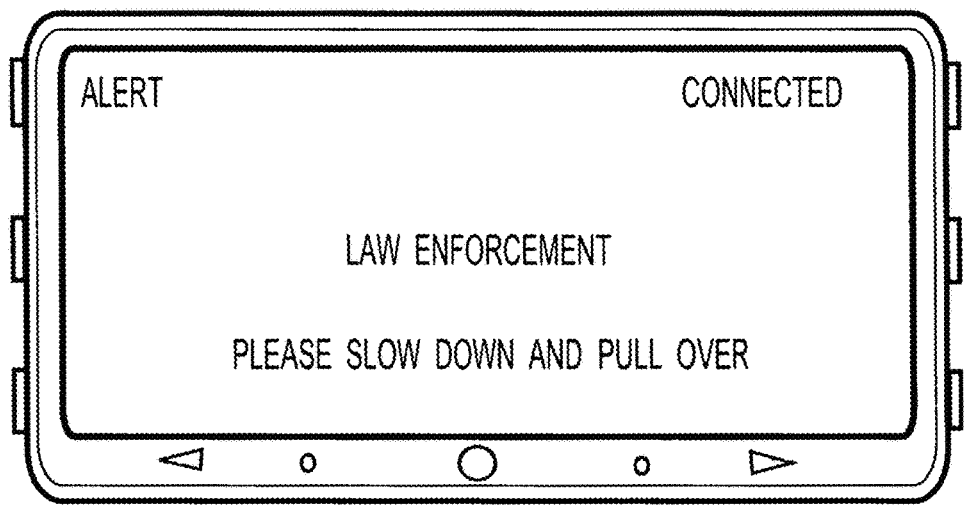
FIG. 15 Illustrates an example of a stop alert or a high-speed chase alert message displayed on the vehicle LCD unit.
Figure 16:
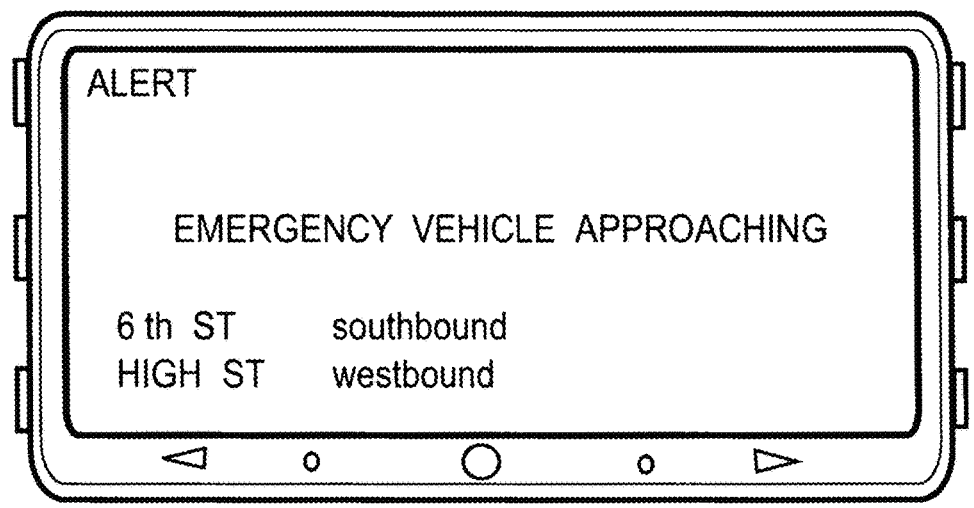
FIG. 16 Illustrates an example of an emergency vehicle alert message displayed on the vehicle LCD unit.
Figure 17:
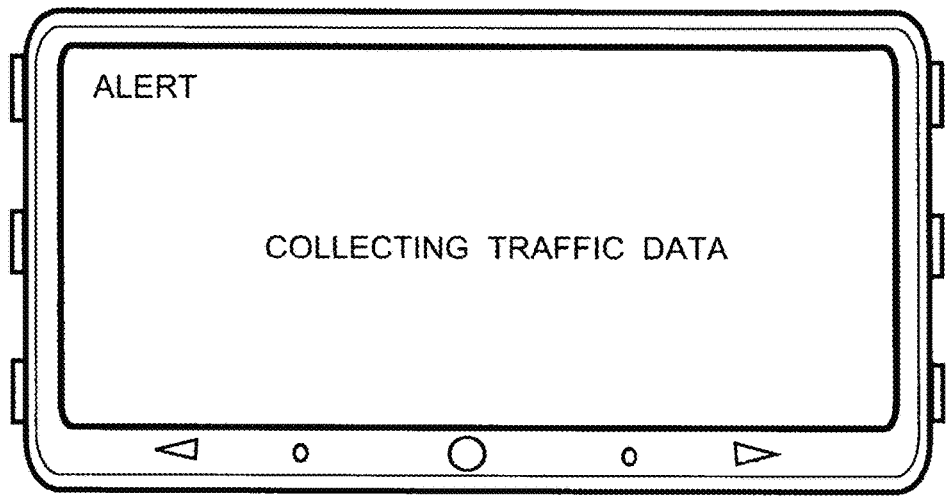
FIG. 17 Illustrates an example of a collecting traffic alert message displayed on the vehicle LCD unit.
Figure 18:
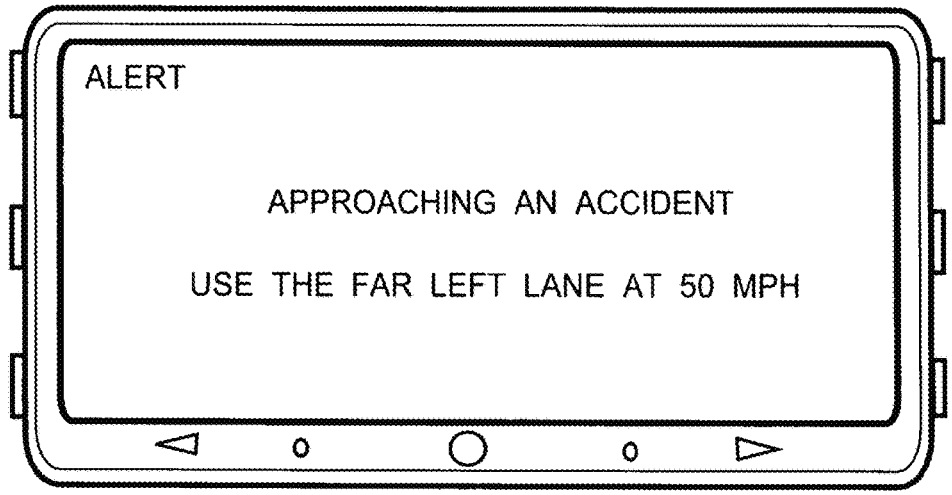
FIG. 18 Illustrates an example of a roadway safety alert messge displayed on the vehicle LCD unit.
Figure 19:
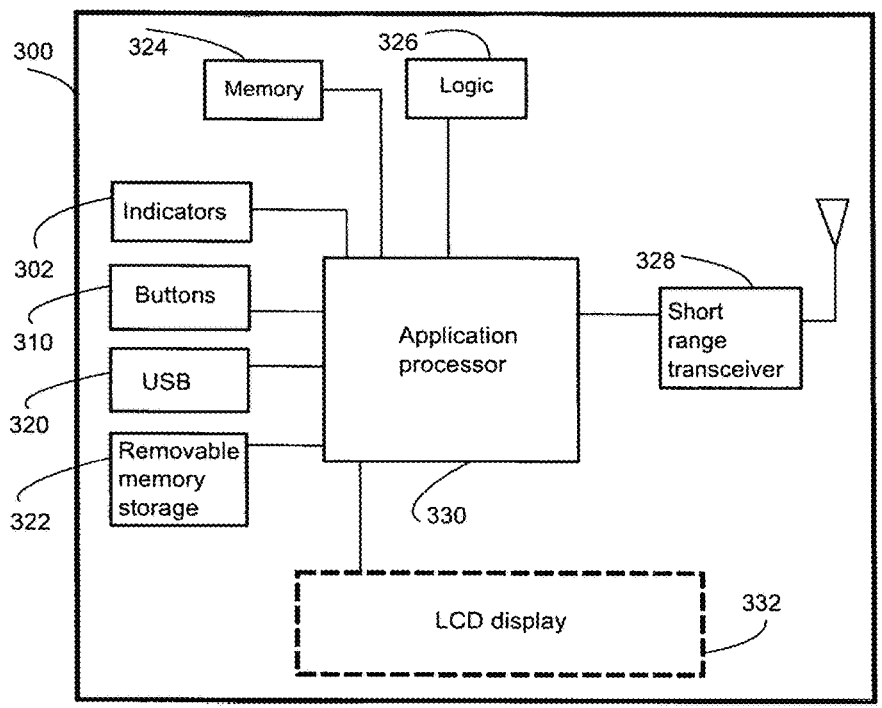
FIG. 19 Is a block disagram of the spot logging unit (surveillance data logger) 300.
Figure 20:
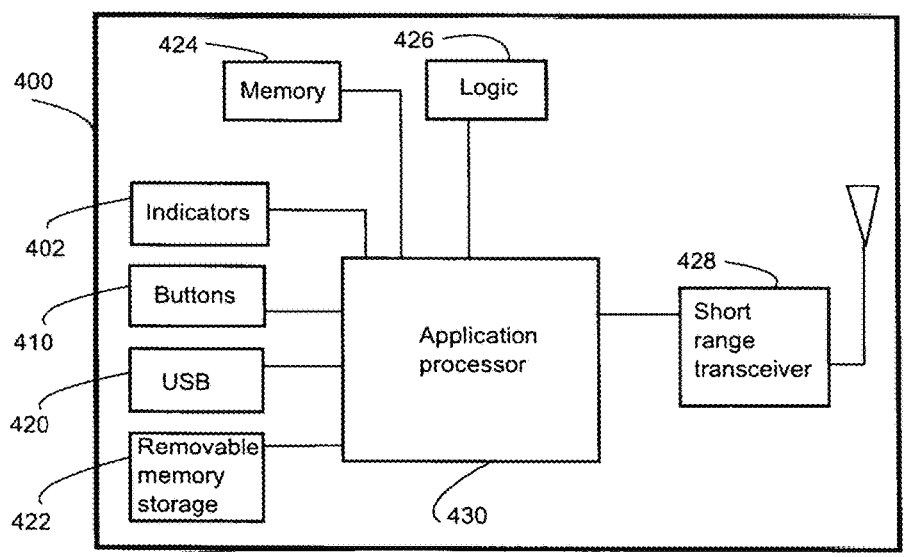
FIG. 20 Is a block diagram of the traffic logging unit (surveillance data logger) 400.
Figure 21:
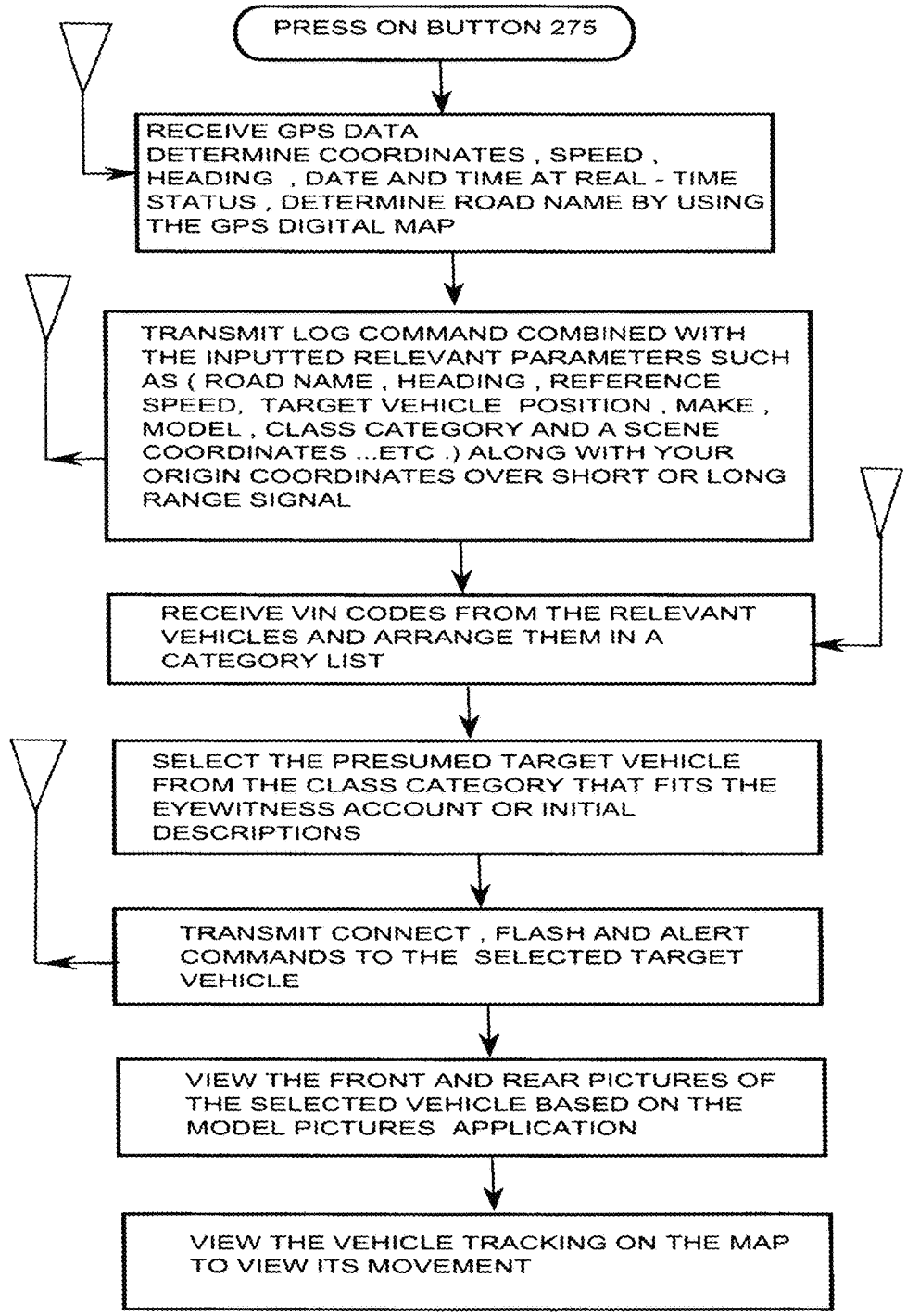
FIG. 21 Illustrates an example flow chart of a high-speed chase process.
Figure 22:
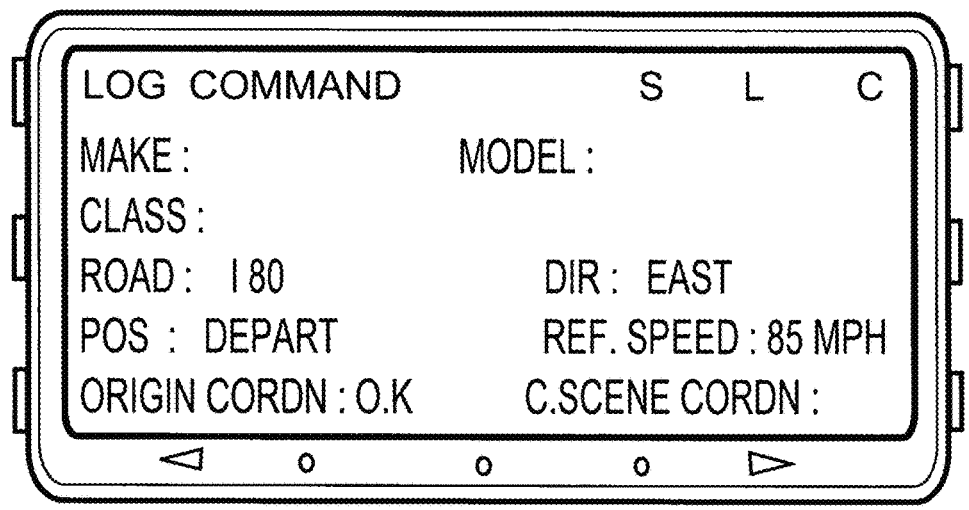
FIG. 22 Illustrates an example of a high-speed chase process, it shows the inputted parameters by the police to apply a log command.
Figure 23:
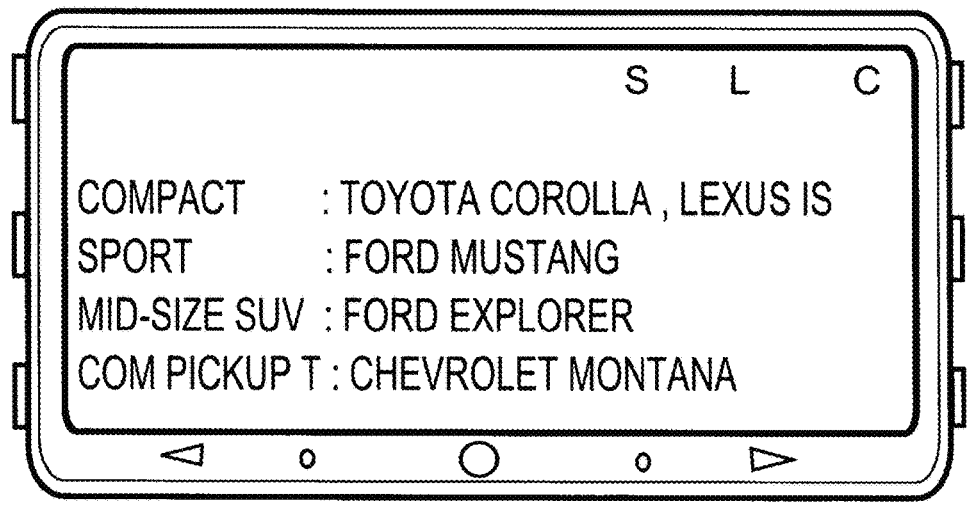
FIG. 23 Illustrates a class category list of the responding vehicles.
Figure 24:
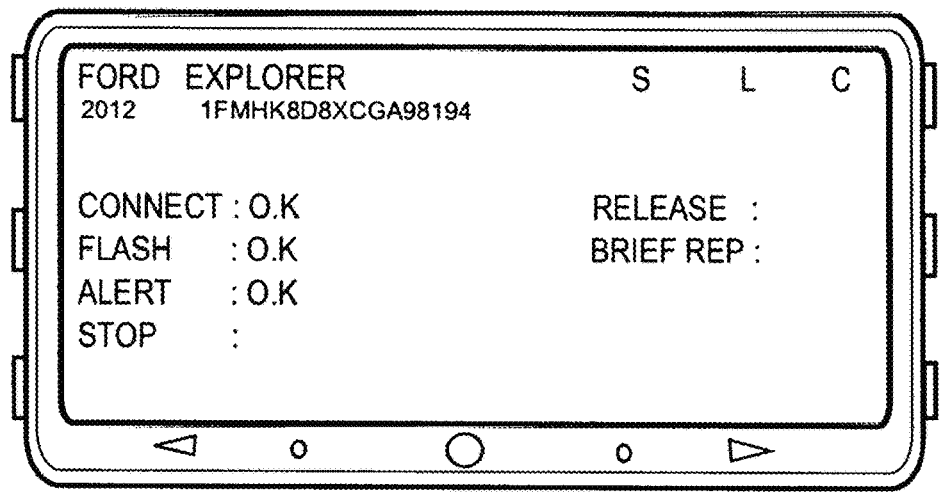
FIG. 24 Illustrates inputting (connect, flash and alert) commands to transmit them to the target vehicle.
Figure 25:
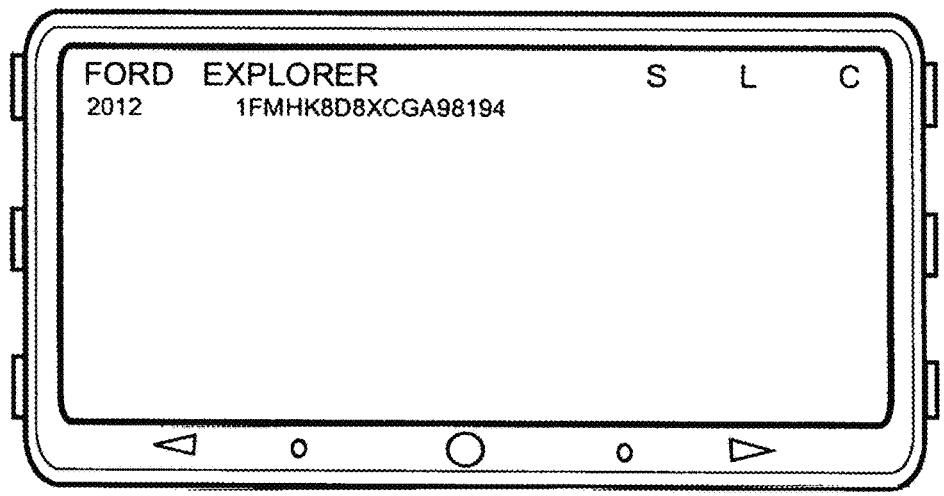
FIG. 25 Illustrates the rear and front pictures of the target vehicle based on its model.

As shown in FIG. 3 and FIG. 4, the police vehicle unit P210 includes similar electronic components as the vehicle unit V10, and is programmed to communicate with the vehicle unit V10 via the long range (1-2 mile) and the short range (0.1-0.2 mile) radio frequency, also the police unit P210 can communicate with the vehicle unit V10 via the cellular network.

Furthermore, the memory 220 stores the "control operating system" which is responsible for all the control commands needed to manipulate the vehicle unit V10. The memory 220 stores the vehicle model, type and class application, and also stores the database of the GPS digital map application.

The unit P210 is installed inside the police vehicle in either a portable manner or in an installation manner similar to the unit V10.

The police LCD unit 240 as shown in FIG. 4, includes a touch screen LCD display 246 which can display colored pictures of a wide range of vehicles' models. The LCD display 246 is used to display the response messages transmitted by the vehicle unit V10, it is also used as an interface to activate the control commands. The LCD unit 240 also includes a microphone module 254, a speaker module 256, and a headset jack module 258 for audio communication with the vehicle unit V10, they are also used to activate the control commands via the voice recognition application.

Generally the LCD unit 240 includes application processor 248, the memory 242 to store the vehicle model, type and class application, it also stores the in-car traffic light cycle application which is a component of the in-car traffic light system, camera module 250 to keep at least ten minutes of recorded video of the roadway, LED indicators 260 to be used for in-car traffic light system and for alerting/warning indication, the buttons 270, a USB port 280, and a removable memory storage 282. The application processor 248 is responsible for interpreting and executing the control commands and sub-commands from the users interface. The USB 280 is used to update the digital map application, the vehicle model, type and class application, and the in-car traffic light cycle application. The USB 280 is also used to update the entire operating system and the control commands. The removable memory storage 282 is used for keeping a record of the police vehicle unit P210 activity for predetermined period of time. The LCD unit 240 is connected to the police vehicle unit 210 via a USB cable which is connecting the USB port 247 to the USB port 222. The USB port 222 supplies electric power across the cable to the LCD unit 240.

The LCD unit 40 as shown in FIG. 2, includes electronic components similar to the LCD unit 240, but its memory 42 stores the in-car traffic light cycle application and the video records for at least ten minutes of the roadway and the GPS readings for at least the last thirty minutes of the vehicle movement. Its LCD display 46 is used to display alert/warning messages transmitted by the police unit P210. The LCD display 46 is also used to display the in-car traffic related messages and alert messages transmitted by the traffic logging unit 400. The application processor 48 is responsible for interpreting and executing most of the commands from the users interface. The USB port 80 is used to update the digital map application and the in-car traffic light cycle application. The removable memory storage 82 is used for having a copy of video record of at least the last ten minutes of the roadway, wherein five minutes of this record is after the vehicle fully stopped. Also the removable memory storage 82 is used to have a GPS records of at least the last thirty minutes of the vehicle movement. The video and GPS records will be used for the accident report file for legal or financial purposes. The vehicle unit V10 is designed to communicate with the police vehicle unit P210 even if the LCD unit 40 is being removed or disconnected and without affecting the functionality of the control command system. The Light Emitting Diodes indicators 60 include a green LED indicator 61, a yellow LED indicator 62, a red LED indicator 63, a green right arrow LED indicator 64, and a green left arrow LED indicator 65. When the vehicle unit V10 receives any alert message from (a police unit P210, or a traffic logging unit 400), the yellow LED indicator 62 will start flashing. Generally, the LED indicators 60 are used to illuminate the synchronized LED's in-car traffic light cycle.

Figure 27:
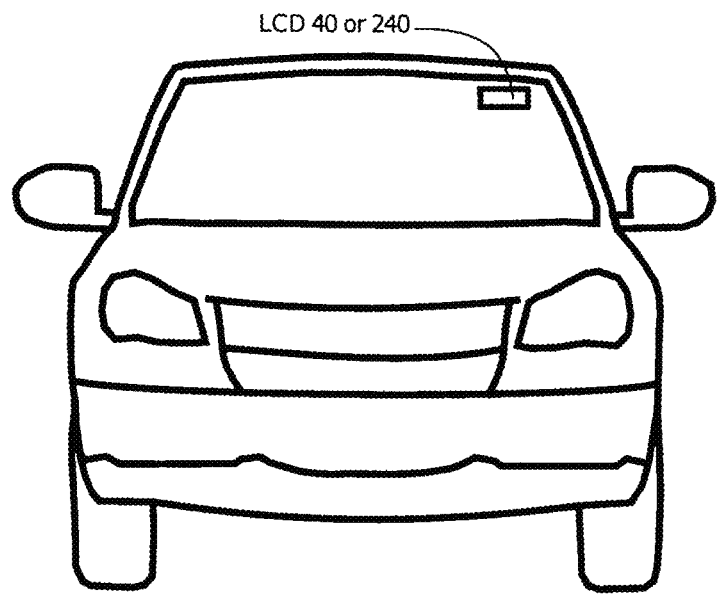
FIG. 27 Illustrates the location and the position of installation the police LCD unit or the vehicle LCD unit inside the car.
Figure 28:
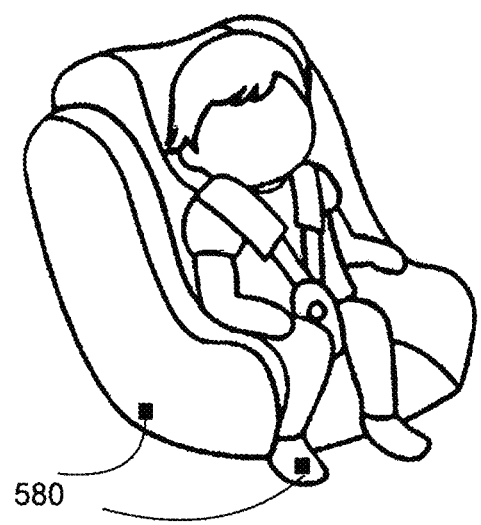
FIG. 28 Illustrates an example of RFID tags being attached to a baby car seat or attached to his shoe.

The LCD unit 40 is connected to the vehicle unit 10 via a USB cable which is connecting the USB port 47 to the USB port 22. The USB port 22 supplies electric power across the cable to the LCD unit 40. The LCD unit 40 and the police LCD unit 240 installed to face the driver by an appropriate manner without blocking the line-of-sight with the road or with the street traffic lights as shown in FIG. 27.

Model, Type and Class Category of Vehicles

In general a VIN code of a vehicle, is a unique code including a serial number, used by the automotive industry to identify individual motor vehicles, as defined in ISO 3833.

The vehicle descriptor section of the VIN code is used to identify the vehicle type, the model and the body style. While, vehicle identifier section of the VIN is used to identify the individual vehicle. The vehicle descriptor section of the VIN code will tell in which class category the vehicle belongs, therefore when the police vehicle unit P210 receives a VIN code transmitted by a unit V10, the unit P210 will know instantly the type, model and the class category (body style) of the vehicle. The police vehicle unit P210 is programmed to decode the VIN code to turn it into a vehicle class category and a model/type form to enable the police officer to a quick pick of a target vehicle from a category list displayed on the LCD display 246. For example, if the unit P210 received a VIN code from a "Toyota Avalon", the unit P210 will determine that the vehicle belongs to (FULL-SIZE CATEGORY), and if it receives a VIN code from a "Cadillac Escalade", the unit P210 will determine that the vehicle belongs to (FULL-SIZE SUV CATEGORY), . . . etc. Also the unit P210 is programmed with a directory of a wide-range of model/type pictures of vehicles to enable the police officer to view the rear/front side pictures of a vehicle who transmitted its VIN code. The function and the merits of the vehicle class category list and the model/type picture application will be clear while illustrating the high-speed pursuit system and others.

An Example List of the Vehicle Class Category

SUBCOMPACT: (examples: Ford Fiesta, Chevy Spark, Chevy Sonic, honda fit, Hyundai Accent, Kia Rio, Mazda2, Nissan Versa).

COMPACT: (examples: Subaru Impreza, Nissan Sentra, Toyota Corolla, Scion tC, Lexus IS, Honda Civic, Acura TSX).

MID-SIZE: (examples of midsize vehicles: Honda Accord (coupe)), Acura TL, Hyundai Sonata, Kia Optima, Mazda6, Infiniti G, Toyota Camry).

FULL-SIZE: (examples of full-size vehicles: Toyota Avalon, Lexus LS, BMW 7-Series, Mercedes-Benz (S-Class), Audi A8, Hyundai Genesis).

SPORT CAR: (example of sport vehicles: Dodge Challenger, Ford Mustang, Chevy Camaro, Honda CR-Z, Nissan Z, BMW M-Series, Audi TT).

CONVERTIBLE: (examples of convertible vehicles: BMW 6 Series, Chevrolet Camaro, Mercedes CLK, Volvo C70, Volkswagen Eos).

COMPACT CUV (MINI MPV): (examples: Jeep Compass, Chevy HHR, Honda Element, Acura RDX, Hyundai Tucson, Kia Sportage).

MID-SIZE CUV: (examples: Dodge Journey, Ford Edge, Lincoln MKX, Chevy Equinox, GMC Terrain, Cadillac SRX).

FULL-SIZE CUV: (examples: Dodge Durango, Lincoln MKT, Ford Flex, GMC Acadia, Mercedes-Benz (R-Class), Audi Q7).

OTHERS: (example: Lincoln Town Car limousine).

COMPACT SUV: (examples: Mazda Tribute, Nissan Xterra, Subaru Forester, Jeep Wrangler, Jeep Patriot, Jeep Liberty).

MID-SIZE SUV: (examples: Jeep Grand Cherokee, Ford Explorer, Honda Pilot, Acura MDX, Kia Borrego, Nissan Pathfinder).

FULL-SIZE SUV: (examples: Cadillac Escalade, GMC Yukon, Lincoln Navigator, Ford Expedition, Lexus LX).

MINI VAN: (examples: Chrysler Town and Country, Ford Galaxy, Peugeot 807, Renault Espace, SEAT Alhambra).

FULL-SIZE VAN: (examples: Ford E-Series, Chevy Express).

CARGO VAN: (examples: Ford Transit Connect, Chevrolet Express 1500 Cargo, Ford E350 Van).

BUS: - - -

COMPACT PICKUP TRUCK: (examples: Chevrolet Montana, Fiat Strada, Volkswagen Saveiro, Ford Ranger).

MID-SIZE PICKUP TRUCK: (examples: Dodge Dakota, Chevy Colorado, GMC Canyon, Honda Ridgeline, Toyota Tacoma).

FULL-SIZE PICKUP TRUCK: (examples: Toyota Tundra, Nissan Titan, GMC Sierra, Chevy Avalanche, Chevy Silverado, Dodge Ram).
DUMP TRUCK: - - -
SEMI-TRAILER TRUCK: - - -
FULL-TRAILER TRUCK: - - -

Some of the control commands are listed and illustrated based on their purposes as following:

CLONE command is used to allow the vehicle unit V10 to periodically re-transmit any specific command "target command" transmitted by the police unit P210 via the long range frequency. Generally, the target command could be (VIN report command) or (RFID tag report command). The clone command is used to widely increase the number of vehicles that will do the scan search of a particular vehicle or a particular RFID tag, cloning is a process to multiply the number of vehicles that mimic police vehicles in performing a search process.

CONNECT command is used to connect the target vehicle to the cellular network, the police unit P210 will transmit this command combined with the cell-phone codes (SIM card codes) and a local dispatch center phone number. The target vehicle will periodically send its location data. Also the police officer or the local dispatch center can call the target vehicle or send control commands to it. The local dispatch center will continue track down the movement of the target vehicle and communicate with the police vehicles in the vicinity of the target vehicle.

The cellphone codes will be transmitted from the police unit P210 to the vehicle unit V10 to give it a temporary ability to connect to the cellular network. Each one of the police vehicles will be assigned a number of sets of "Cellphone Codes" to enable the police vehicle unit P210 to lend the vehicle unit V10 the necessary codes that are required for cellular communication. In this scenario the SIM card operating system that required to connect the vehicle unit V10 to the cellular network must be manipulated and redesigned to allow the SIM card codes to be inputted remotely by the P210 unit.

RFID Tags in Close Proximity to Vehicles

Many kids and loved ones go missing every year, and this may cause a huge pain and severe long lasting psychological trauma for the parents, family members and friends. People go missing for a number of reasons, an old person with the Alzheimer's disease may wander around or get lost without the ability to contact his family or his care giver. Some of the teenagers runaway from their families is often a common problem. Children and adults may go missing when they become victims of a foul play.

Generally when a loved one goes missing, panic occurs, and his family's mind is in turmoil, his family accounts—in as much detail as possible where the person was and what he was doing before he went missing. This may urge calling friends, family members or going to places that the person frequents, and finally filing a missing person report with the local police. The GPS tracking devices are good in providing tracking of a person carrying the GPS tracking device, but the drawback of the GPS tracking devices are they are bulky and they require a costly subscribing service with a cell phone carrier and they don't make any physical connection with vehicles to prove that a victim of a crime was an occupant of a suspect vehicle in a manner similar to fingerprints or blood stains left by the victim inside the vehicle.

Furthermore, robbery or burglary is a serious crime when a perpetrator commits an offense, usually that offense will be theft. Generally the perpetrator or perpetrators use a getaway car to escape the crime scene after committing the offense.

There are some known ways the police use to fight robbery crimes such as bank robbery, these ways may include hiding a GPS device with cash stolen by the robbery suspect, and tracking him down then arresting him. Also banks may use RFID tags hidden with the cash to assist in tracking the stolen cash, which may lead to the arrest of a suspect robber, but the drawback of GPS tracking devices is that these devices are bulky and easily thrown away by the criminals when they notice them coupled to the stolen property or cash, also the drawback of the well known RFID tags is they are useless unless they are activated by RFID tag reader which is not accessible 99.99% of the time outdoor.

Radio-frequency identification (RFID) are used for the purposes of automatically identifying and tracking tags attached to objects, such as personal possessions, clothing, cash, . . . etc. The tags contain electronically stored information. Some types of very short range (a few meters) active/semi active tags have an on-board tiny battery and periodically transmit their identification signal.

The present method and system utilizes the RFID technology to allow a very short range (few meters) read-only active/semi active RFID tags to be logged in the vehicle unit V10 at real-time status. When the tag is in close proximity to the vehicle unit V10 to make a real connection between the missing person or the stolen object that carries the RFID tag and a vehicle or vehicles to assist in a quick and efficient tracking search, also to use this connection as an evidence in criminal cases.

Generally, when an RFID tag passes through the field of the scanning antenna, it detects the activation signal from the antenna. That "wakes up" the RFID chip, and it transmits the information on its microchip to be picked up by the scanning antenna of the tag reader (interrogator).

Whereas, radio-frequency identification (RFID) active/semi active tag of the present invention uses a very short range preferably (2 to 6 meter) radio frequency to communicate with the vehicle unit V10 over its short range frequency transceiver 24. The tag will automatically and periodically transmit its identification signal once every one or few minutes to protect its on-board battery from wearing out in a short time, the user can remove the on-board battery every time the tag is not in use. Additionally, in another embodiment of the RFID tag, the tag will start periodically transmit its identification signal every time the user activates it by pressing on a button integrated in it, and when the vehicle unit V10 comes in the range of the tag signal, it will store the tag ID in real-time status. Therefore, the vehicle unit V10 programmed to create a tag report which contains the tag ID, the VIN code of the vehicle, the date/time and period of time in which the tag was logged in the vehicle and a brief location of the vehicle when the tag was logged in the vehicle.

When law enforcement officers are suspecting that a missing person carrying an RFID tag of the present invention is a victim of a crime or just missing, or a stolen property has an RFID tag attached to it, friends or family members of the missing person or the owner of the property can provide the law enforcement officers with the RFID tag ID, the police vehicle unit 210 is configured to transmit RFID command to allow the target vehicle that has RFID tag logged in it to connect to the cellular network and send location report, the location report contains the VIN code of the target vehicle and its location at real time status. The police unit P210 will transmit the RFID command combined with the connect command and the clone command, the clone command to allow the vehicle unit V10 of other vehicles to periodically re-transmit the same data. The clone command is used to widely increase the number of vehicles that will do the scan search of a particular tag, cloning is a process of multiply the number of vehicles that mimic police vehicles in performing a search process to cover a very wide area in a short time period.

RFID tag command is used to allow the vehicles' units V10 to send a report about a particular tag "target tag". The police unit P210 will transmit the clone command combined with the RFID tag command along with the connect command, these commands contain the cell-phone codes, the local dispatch center's phone number, the target tag ID and a time window. Time window is a period of time in minutes, for example (60 or 120 minutes), to allow the vehicle unit V10 to randomly select a time within the time window to connect to the cellular network and send the RFID tag report. This way if the tag was logged in a number of vehicles, each one of these vehicles can connect and report in different times without any possible interference.

The vehicle unit V10 is configured to store a brief record of RFID tags including a brief date/time and location of the vehicle associated with the tag, to store the briefed data for preferably few months or even a couple years for future search investigation.

Certain additional advantages and features of this invention may be apparent to those skilled in the art upon studying the disclosure, or may be experienced by persons employing the novel system and method of the present invention.

While the invention has been described with a limited number of embodiments, it will be appreciated that changes may be made without departing from the scope of the original claimed invention, and it is intended that all matter contained in the foregoing specification and drawings be taken as illustrative and not in an exclusive sense.

The invention claimed is:

1. A system for missing person and stolen property search by remotely logging surveillance data transmitted by an RFID tag attached to the missing person or attached to the stolen property where the RFID tag in close proximity to vehicles; wherein the vehicles receive and store the surveillance data to make a real time connection between the vehicles and the RFID tag; the system comprising: a first in-vehicle apparatus on-board civilian vehicles; a second in-vehicle apparatus on-board law enforcement vehicles; an RFID tag attached to a person or attached to a portable property; wherein the first in-vehicle apparatus is configured to wirelessly communicate with the RFID tag to receive data associated with the RFID tag; wherein the first in-vehicle apparatus on-board the civilian vehicle comprising:
   a) wireless communication means to communicate with, the RFID tag, law enforcement vehicles and local dispatch centers, and comprising, a cellular network communication module, a long and a short range transceiver module;
   b) at least one memory comprising computer program code for one or more programs, the memory further comprises a VIN code of the vehicle and the data associated with the RFID tag;
   c) at least one GPS receiver module to enable the vehicle to determine its position coordinates, speed, course and date/time at real-time status; and,
   d) at least one processor being coupled to said wireless communication means, and said memory;
wherein the RFID tag periodically transmits a very short range signal to prompt the first in-vehicle apparatus in the range of the RFID tag signal to extract the RFID tag identification; wherein the first in-vehicle apparatus is configured to create an RFID tag report which contains the vehicle's VIN code, the RFID tag identification and a brief record of the vehicle's location/date and time while the first in-vehicle apparatus in the range of the RFID tag signal; wherein the data associated with the RFID tag are used by the second in-vehicle apparatus on-board law enforcement vehicles to track down a suspect vehicle involved in a crime associated with the RFID tag.

2. The system of claim 1, wherein the RFID tag is used for person's and property's security, and comprising:
   a) wireless communication means to communicate with a vehicle in close proximity to the RFID tag signal;
   b) a memory comprising the RFID tag identification; and,
   c) on-board battery.

3. The system of claim 1, wherein the second in-vehicle apparatus on-board the law enforcement vehicle comprising:
   a) wireless communication means to communicate with a target vehicle that has a target RFID tag identification logged in its first in-vehicle apparatus, a local dispatch center and law enforcement vehicles, and comprising, a cellular network communication module, a long and a short range transceiver module;
   b) at least one memory comprising computer program code for one or more programs, the memory further comprises: a plurality of control commands to remotely manipulate the target vehicle; a plurality of cellular network communication codes are required to remotely connect the target vehicle to the wireless cellular network;
   c) a database comprising: a plurality of make/model and body style category list of vehicles, and a set of vehicle's photos associated with each make/model, wherein each body style category comprises vehicles that have similar body style;
   d) at least one GPS receiver module to enable the law enforcement vehicle to determine its position coordinates, speed, course and date/time at real-time status; and,
   e) at least one processor being coupled to said wireless communication means, said memory and said database;
wherein the second in-vehicle apparatus transmits the target RFID tag identification combined with the connect and clone commands to force the target vehicle to transmit its real time location and the RFID tag report of the target RFID tag to be received by the local dispatch center.

* * * * *